United States Patent
Holler

(10) Patent No.: US 9,886,294 B2
(45) Date of Patent: Feb. 6, 2018

(54) METHOD AND DEVICE FOR TESTING AN ELECTRONIC CONTROL UNIT USING A SIMULATOR RUNNING ON A COMPUTER OF DIFFERENT CORE TYPE

(71) Applicant: dSPACE digital signal processing and control engineering GmbH, Paderborn (DE)

(72) Inventor: Dominik Holler, Schlangen (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 48 days.

(21) Appl. No.: 14/861,071

(22) Filed: Sep. 22, 2015

(65) Prior Publication Data
US 2016/0085567 A1  Mar. 24, 2016

(30) Foreign Application Priority Data
Sep. 23, 2014 (EP) ..................... 14185873

(51) Int. Cl.
*G06F 9/455* (2006.01)
*G05B 19/418* (2006.01)

(52) U.S. Cl.
CPC ....... *G06F 9/455* (2013.01); *G05B 19/41885* (2013.01); *G06F 9/45558* (2013.01);
(Continued)

(58) Field of Classification Search
CPC .. G06F 9/455; G06F 9/45504; G06F 9/45558; G06F 2009/45583
See application file for complete search history.

(56) References Cited

U.S. PATENT DOCUMENTS 6,292,883 B1 * 9/2001 Augusteijn ......... G06F 9/30174
 707/999.202
7,181,382 B2 * 2/2007 Shier ................... G06F 11/2273
 702/182
(Continued)

FOREIGN PATENT DOCUMENTS

DE 10 2010 025 954 A1 1/2012
EP 2778816 A1 * 9/2014 ....... G05B 19/41885

OTHER PUBLICATIONS

Extended European Search Report for European Application No. 14185873 dated Jan. 28, 2015 with English translation.
(Continued)

*Primary Examiner* — Abu Ghaffari
(74) *Attorney, Agent, or Firm* — Muncy, Geissler, Olds & Lowe, P.C.

(57) ABSTRACT

A method for executing a first application program of a first control unit on a computer, wherein functions for controlling actuators and/or sensors and/or functions for processing and/or providing data from actuators and/or sensors are executed by the first application program. A first interface between a control unit hardware and a first application program of the control unit is established by the control unit operating system. A first virtual control unit operating system and a first virtual application program are generated by compilation. A simulation environment interface is made available by the simulation environment for transfer of a data item and/or of an event to the first virtual application program and/or the virtual control unit operating system. The simulation environment initiates and controls an execution of the first virtual application program within the control unit operating system within the first virtual machine through the simulation environment interface.

18 Claims, 5 Drawing Sheets

(52) U.S. Cl.
CPC ...... *G06F 9/45504* (2013.01); *G06F 9/45533* (2013.01); *G06F 2009/45583* (2013.01); *Y02P 90/26* (2015.11)

(56) References Cited

U.S. PATENT DOCUMENTS

| | | | | |
|---|---|---|---|---|
| 7,356,455 | B2* | 4/2008 | Quayle | G06F 17/5022 703/13 |
| 2005/0071513 | A1* | 3/2005 | Aguilar, Jr. | G06F 9/5044 710/1 |
| 2005/0246453 | A1* | 11/2005 | Erlingsson | G06F 9/4555 710/1 |
| 2006/0282248 | A1* | 12/2006 | Kageyama | G06F 17/5009 703/13 |
| 2008/0077370 | A1* | 3/2008 | Frick | G09B 5/00 703/6 |
| 2009/0037911 | A1* | 2/2009 | Ahuja | G06F 9/5044 718/100 |
| 2009/0089700 | A1* | 4/2009 | Gu | G05B 19/41885 715/771 |
| 2009/0132059 | A1* | 5/2009 | Schultz | G05B 19/05 700/7 |
| 2011/0271079 | A1* | 11/2011 | Rymarczyk | G06F 9/30181 712/32 |
| 2012/0156557 | A1* | 6/2012 | Kotato | H01M 10/052 429/200 |
| 2012/0260250 | A1* | 10/2012 | Maeda | G06F 21/53 718/1 |
| 2013/0103379 | A1* | 4/2013 | Nam | G06F 8/30 703/22 |
| 2013/0145375 | A1* | 6/2013 | Kang | G06F 21/53 718/104 |
| 2014/0040441 | A1* | 2/2014 | Greifeneder | G05B 19/41885 709/220 |
| 2014/0053165 | A1* | 2/2014 | Stellwag | G05B 19/0426 719/312 |
| 2014/0088946 | A1* | 3/2014 | Schumpelt | G05B 17/02 703/13 |
| 2014/0343915 | A1* | 11/2014 | Song | H04L 41/145 703/13 |
| 2016/0033952 | A1* | 2/2016 | Schroeter | G05B 19/41885 700/108 |
| 2017/0003967 | A1* | 1/2017 | Lin | G06F 9/3017 |

OTHER PUBLICATIONS

Helmbrecht et al., "Virtualization: Technologies and Applications oriented to security," Report, Inst. for Tech. Comp. Sci., pp. 1-54 (Aug. 2010) with English translation.
"VM History and Heritage," IBM, p. 1 (2004).
AUTOSAR Specification of Operating System, pp. 1-230 (2011).
AUTOSAR Technical Overview, pp. 1-42 (2011).
PikeOS, pp. 1-2 (2012).
Robert Goldberg, "Survey of Virtual Machine Research," Computer, pp. 34-45 (Jun. 1974).
IBM Systems Virtualization, pp. 1-20 (Dec. 2005).
Sysgo, OpenSynergy, pp. 1-2 (Jan. 17, 2011) with English translation.
"EB Working with IBM on Sofware Development Solution for AUTOSAR standard," Press Release, pp. 1-2 (Nov. 30, 2011).
Timekeeping in VMWare Virtual Machines, pp. 1-32 (2011).
EB Tresos Wincore, pp. 1-3 (2011).
Stecklina et al., "Towards a Secure Address Space Separation for Low Power Sensor Nodes," pp. 1-6.
Navet et al., "Virtualiztion in Automotive Embedded Systems: an Outlook," presentation at RTS Embedded Systems, Paris (Mar. 31, 2010).
Synopsys, "Synopsys' Virtualizer Speeds Software Development and Enhances Design Enablement for Systems Based on the Infineon AURIX Microcontroller Family," pp. 1-2, News Release (Jun. 26, 2012).
Briday et al., "Modelisation of a Distributed Hardware System for Accurate Simulation of Real-Time Applications," pp. 1-8.
Synopsys, "Improve your Existing Embedded Software Development Environment," p. 1 (2012).
Martinus et al., "Einsatzfaelle Der VAP Im E/E-Entwicklungsprozess,", ATZ Electronik, pp. 56-61 (Jan. 2012) with English translation.
Achim Nobl, Synopsys, "A Closer Look at Software Development for ARM's big.LITTLE Processing—Part I," A View from the Top, pp. 1-3 (Mar. 22, 2012).
European Office Action for European Application No. 14185873.8 dated Nov. 14, 2016 with English translation.
European Office Action for European Application No. 14185873.8 dated Mar. 24, 2017 with English translation.
Dr. Christian Wawersich, "Which memory protection technology is the right one with Autosar?" at http://www.all-electronics.de/welche-speicherschutz-technik-ist-beiautosar-richte, pp. 1-3 (Nov. 6, 2007) with English translation.
Massimo, "A brief architectural overview of VMWare, ESX, XEN and MS Viridian," at http://www.it20.info/2007/06/a_letter_architecture_overview-ofvmware-esx-xen-and-ms-viridian, pp. 1-8 (Jun. 17, 2007).

* cited by examiner

Prior Art

METHOD AND DEVICE FOR TESTING AN ELECTRONIC CONTROL UNIT USING A SIMULATOR RUNNING ON A COMPUTER OF DIFFERENT CORE TYPE

This nonprovisional application claims priority under 35 U.S.C. §119(a) to European Patent Application No. 14185873, filed Sep. 23, 2014, which is herein incorporated by reference.

BACKGROUND OF THE INVENTION

Field of the Invention

The invention relates to a method for executing an application program of a control unit on a computer.

Description of the Background Art

In the development process for modern electronic control units, it is indispensable nowadays to test the control units as early in the development as possible.

Control units are electronic modules that are predominantly installed in places where something is electronically controlled or regulated. Electronic control units are used in the automotive field, in particular, where they perform such tasks as controlling mechanical or electric actuators and evaluating sensor data. Control units are considered embedded systems. An application program, for example for controlling the electronics, for processing sensor data, and/or for communication, is executed on a control unit.

In order to structure the control unit development process efficiently and to detect errors as early as possible, the application programs that are executed on the control unit typically are tested even before the control unit is present as hardware. These early tests are known as "virtual ECU testing" or as virtual control unit testing, and are disclosed, for example, in "Virtual Validation with dSPACE", a dSPACE product information.

In virtual control unit testing, even though the control unit does not have to be physically present, the control unit code must be present in a hardware-independent high-level language (e.g., C/C++). As a rule, the processor core/computing core implementation of the test equipment is different from that of the control unit under test. For example, in PC-based test equipment, Intel processors that have a corresponding instruction set (e.g., Intel IA32) are used as computing cores of a first type, whereas control units are generally microcontroller-based, and thus have a computing core of a second type that differs from the first type and has a second instruction set (e.g., the C166 instruction set of the C166 microcontroller family) that differs from the first instruction set.

In virtual control unit testing, the application program has heretofore been executed as a user process of the computer operating system (e. g. Windows, MacOS, Linux) on a simulation computer or computer. User processes have the disadvantage that they generally have no capability for direct access to the computer hardware, as for example hardware units for implementing memory protection.

SUMMARY OF THE INVENTION

It is therefore an object of the present invention to provide an efficient method that further develops the state of the art.

In an embodiment, the object is attained by a method for executing a first application program of a first control unit on a computer. Here, the first application program can execute functions for controlling actuators and/or functions for processing sensor data. The first control unit has a control unit hardware unit with at least one first computing core of a first computing core type. The computer has a computer hardware unit with at least one second computing core of a second computing core type. In this context, the first computing core type and the second computing core type can differ at least with regard to the instruction set used. Furthermore, a source code of a control unit operating system is present. A first interface between the control unit hardware and the first application program of the first control unit is established by the control unit operating system. In addition, a source code of the first application program is present. The source code of the control unit operating system and the source code of the first application program are compiled to be executable on the second computing core type, wherein a first virtual control unit operating system and a first virtual application program are generated by the compilation. In addition, the computer has a simulation environment, wherein a simulation environment interface is made available by the simulation environment for transfer of a data item and/or of an event to the first virtual application program and/or the virtual control unit operating system. The computer also has a computer operating system, wherein a second interface between the computer hardware and the simulation environment is established by the computer operating system. Furthermore, the computer has a hypervisor, wherein the hypervisor provides a first virtual machine of the computer, and the computer hardware is made partly or completely available in the form of virtual hardware by the first virtual machine. The virtual hardware comprises at least one first virtual computing core. The virtual control unit operating system is executed in the first virtual machine. The simulation environment initiates and controls an execution of the first virtual application program within the control unit operating system within the first virtual machine through the simulation environment interface. The control comprises the transfer of data and/or events to the virtual application program and/or the virtual control unit operating system. By means of this method, the virtual control unit operating system provides the first application program with direct access to the hardware made virtually available of the first virtual machine.

An advantage of the invention is that the virtual application program can be executed in an environment that has smaller differences for the virtual application program from the application environment in a real control unit than is the case in the prior art. In particular, the computer operating system in the method according to an embodiment of the invention has no disturbing or restrictive effect on the execution of the virtual application program of the control unit within the virtual control unit operating system. Furthermore, in the method according to the invention, the virtual application program under test experiences virtual hardware in the form of a virtual machine that can behave like the actual physical hardware of the control unit for the virtual application program and for the virtual control unit operating system.

The methodology known from the prior art of executing the application program as a user process of the computer operating system has the disadvantage for the test that the application program is not executed under the operating system under which it must correctly function on the real control unit. Consequently, errors that are only made possible by the combination of application programs of the control unit with the operating system of the control unit cannot manifest themselves during the virtual control unit test. The method according to the invention avoids these disadvantages.

In an embodiment, the virtual hardware provided by the hypervisor can comprise a memory management unit and/or a memory protection unit of the computer, and the memory management unit and/or memory protection unit are used through the direct access of the application program. The virtual application program can thus access the virtual memory management unit and/or memory protection unit.

The execution of the virtual application program, in the following also referred to as virtual control unit, can also be subject to restrictions that are imposed by the PC operating system. Thus, the PC operating system generally prohibits direct access to hardware elements such as, e.g., memory protection units (MMU, MPU), since memory protection of the processor is managed by the operating system. Furthermore, the computer operating system, such as Microsoft Windows, implements memory protection differently than would typically be the case on a control unit. The memory protection mechanisms in a virtual control unit test can be tested in a very realistic manner by means of the direct access of the virtual application program to the virtual hardware provided by the hypervisor, which includes a memory management unit and/or memory protection unit.

In an embodiment, the first application program meets an AUTOSAR specification, and mechanisms specified by the AUTOSAR specification for using the memory management unit and/or memory protection unit are used within the first application program.

The use of mechanisms for memory protection for automotive control units is standardized in AUTOSAR. These mechanisms cannot be tested with the methods known from the prior art for executing an application program of a control unit on a computer, because no direct access to the memory management unit and/or the memory protection unit is made possible. In contrast, the method according to the invention allows testing on a computer of the AUTOSAR mechanisms for memory protection for automotive control units.

It is not generally the case at present that electronic control units have mechanisms for memory protection. However, in the future it will become increasingly important to make memory protection mechanisms available on electronic control units, since it will become ever more common for safety-critical applications to be executed on the same control unit along with other applications. For this reason, even present-day specifications for control unit software (such as AUTOSAR) already provide rules for the use of these mechanisms. It is therefore inevitable that these mechanisms should also be tested in the case of virtual validation of control units, something that has not been possible heretofore but is made possible by the invention.

In an embodiment according to the invention, the hypervisor can be executed as a user process of the computer operating system.

In this embodiment the hypervisor can be executed as a user process within the computer operating system. It provides the control unit operating system, which conforms to the specification for an operating system for control units, with a replication of the computer in the form of a virtual machine. Execution of the hypervisor as a user process provides the advantage that it is not necessary to change the existing software of the computer, and moreover the simulation environment can communicate with the application program of the control unit in a simple manner.

In an embodiment, the hypervisor can be allowed direct access to the computer hardware, and the hypervisor provides a second virtual machine of the computer, and the computer operating system is executed within the second virtual machine.

In an embodiment, the hypervisor can be executed directly on the computer physically present, and duplicates (multiplexes) its interface to multiple virtual machines. In this design, a virtual machine is made available to the computer operating system. At least one additional replication is made available to a suitable control unit operating system that conforms to the specification of an operating system for control units. Advantages with regard to the performance of the program execution can be achieved through this alternative. Furthermore, possible disturbing influences of the computer operating system can be suppressed in this way.

In an embodiment, the first application program can use at least one computing core of the virtual hardware through direct access in privileged mode.

The computer operating system can prevent use of the CPU in a privileged mode by processes or programs executed within the computer operating system. However, the ability to use the CPU in privileged mode may be necessary for application programs of control units. Testing of this privileged CPU utilization is made possible by the method according to the invention because the hypervisor makes direct use of the (virtual) hardware possible.

According to an embodiment, the first application program comprises a first subroutine and a second subroutine, wherein the first subroutine is executed on the first virtual computing core and the second subroutine is executed on a second virtual computing core.

In an embodiment, source code of a second application program for execution on the control unit is present, the source code of the second application program is compiled to be executable on the second computing core type, wherein a second virtual application program is generated by the compilation, and the first application program is executed on a first virtual computing core and the second application program is executed on a second virtual computing core.

Thus, it is possible to test application programs that use multiple cores of a processor at the same time for different processes or programs.

In an embodiment, a clock rate of the first virtual computing core and/or of the first virtual machine can be changed by the simulation environment.

In general, a processor of a computer has higher performance than a processor of a control unit and thus also has a higher clock rate. This results in faster execution of tasks or processes of the application programs when they are executed on a computer. The described embodiment has the advantage that the clock rate of the processor that is made virtually available can be changed. This has the further advantage that via a slowed clock rate the behavior over time of the application program can be matched to the behavior over time during execution on the control unit.

In a different embodiment, the simulation environment can have a simulator interface to an HIL simulator (hardware-in-the loop simulator), wherein a second control unit is connected to the HIL simulator, and data is exchanged between the second control unit and the first application program, wherein the data exchange takes place via transmission of electrical signals between the HIL simulator and the second control unit.

As such, application programs of control units can be tested early in a combined test as part of a hardware-in-the-loop test with real control units. This is useful when no hardware for the control unit under test is yet present, and at the same time communication with other control units is to be tested.

It also can be determined via the test using an HIL simulator whether the application program performs well under real time conditions, which is to say whether implemented algorithms can be computed in the required sampling intervals, for example.

It is evident that the HIL simulation of real control units has the advantage that the behavior of real control units can be tested safely in a simulated environment. Equally obvious, however, is the disadvantage that the real control units as such must be present in the first place in order to be able to carry out the test. This is disadvantageous because the development of a control unit that is intended to be used in a production application is associated with considerable effort and cost. If it is not discovered until testing of the real control unit that it fails to meet certain requirements, it is not uncommon for considerable work to be needed that far exceeds a simple "fix;" in the worst case, the concept of the control unit must be completely reassessed, requiring the real control unit to be virtually developed anew. The consequence is that planning goals for schedule and cost cannot be met.

With virtual control units, both individual tests and combined tests can be carried out, wherein, in the case of a combined test, a virtual control unit communicates with at least one other virtual control unit or real control unit connected to an HIL simulator.

The test equipment for testing a virtual control unit is conceptually based on the test equipment used to test a real control unit. Such test equipment serves to execute what are called hardware-in-the-loop tests (HIL tests) of real control units or of a combination of real control units that are to be tested in their interaction with one another. Real control units are predominantly microcomputers with real-time capability that are used to influence a technical process. Accordingly, real control units have a computing core on which is executed a real-time operating system that is used to implement sampled-data control systems for regulation and/or control. Real control units act on the process to be influenced through an I/O interface (input/output) or obtain information about the process from measurement instruments through the I/O interface. Testing of a real control unit with the aid of an HIL simulator represents the last step of testing a real control unit before it reaches its actual application environment for use.

In an embodiment of the method according to the invention, a second control unit operating system of the first control unit is implemented, the hypervisor provides a third virtual machine, and the second control unit operating system is executed in a third virtual machine, and a third application program is executed within the second control unit operating system, and the simulation environment initiates and controls an execution of the third application program within the second control unit operating system within the third virtual machine, and the second control unit operating system provides the third application program with direct access to the hardware made virtually available of the third virtual machine.

Based on current developments in the field of control unit development, control units can execute multiple operating systems at the same time through the use of a hypervisor. The described method according to the invention makes it especially simple to test these virtual machines on control units.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 2:
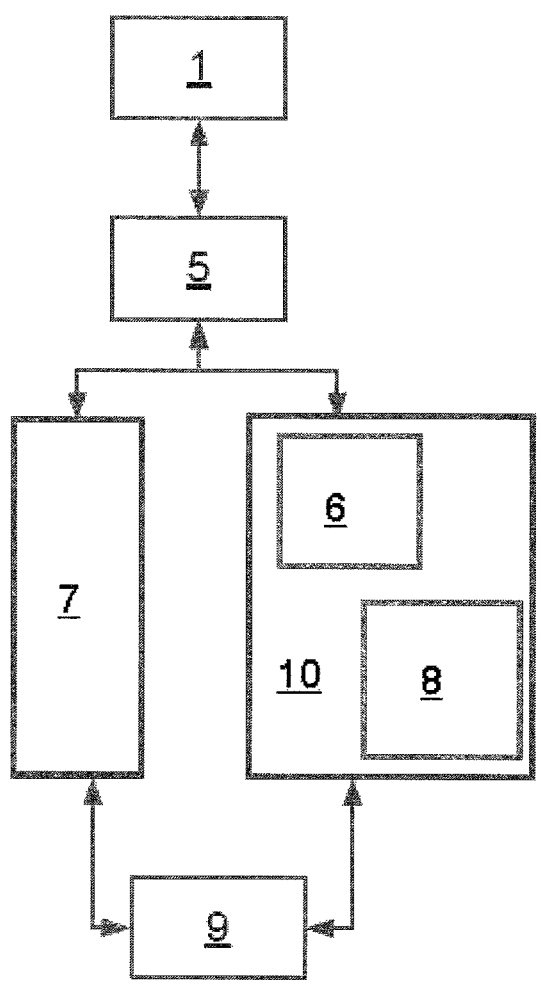
FIG. 2 is a schematic representation of a conventional method for executing an application program of a control unit on a computer.

Shown schematically in FIG. 2 is a conventional method for executing an application program of a control unit. Here, a computer operating system (5) is executed on a computer hardware unit (1). Within the computer operating system (5), a simulation environment (7) and a virtual control unit (10) are each executed as a user process. The virtual control unit (10) comprises a virtual application program (8) and an optional virtual control unit operating system (6). The simulation environment (7) initiates and controls the execution of the virtual control unit (10) through the simulation environment interface (9), wherein the control comprises the transfer of data and/or events to the virtual application program and/or the virtual control unit operating system. The virtual application program here has no direct access to the hardware of the computer, since the computer operating system (5) encapsulates the access to the hardware.

It is likewise known from the conventional art that a virtual control unit (10) is executed as a user process within the computer operating system (5) in addition to the simulation environment (7), wherein a virtual control unit comprises a virtual application program and optionally a virtual control unit operating system (6).

Figure 1:
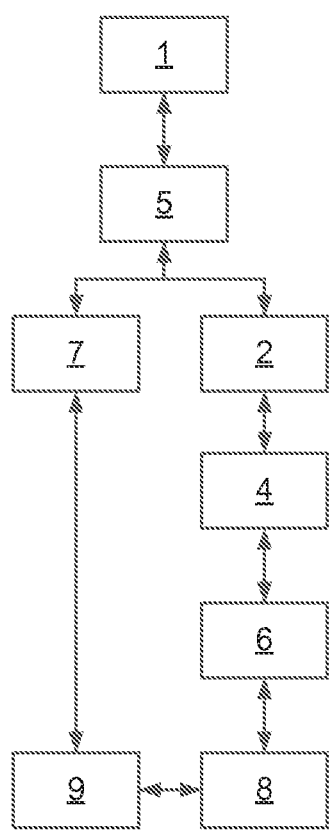
FIG. 1 is a schematic representation of an embodiment of the method according to the invention for executing an application program of a control unit on a computer.

Shown in FIG. 1 is a diagram of an embodiment of the method according to the invention for executing an application program of a control unit of a computer. Here, a simulation environment (7) is executed as a user process within a computer operating system (5) on a computer hardware unit (1). In parallel to the simulation environment (7), a hypervisor (2), also known as a "virtual machine monitor," is also executed here as a user process on the computer operating system (5).

The hypervisor (2) makes it possible for multiple different operating systems to share the hardware resources of a computer, for example by the available capacities of RAMs, processors, and processor cores, including memory protection units, input/output (I/O), DMA controller, and all other relevant components, are transparently divided among the guest systems. By replicating the hardware resource, or parts thereof, the hypervisor makes the hardware virtually available in the form of a virtual machine. An operating system, which can directly access the hardware made virtually available, can be executed directly on this virtual machine.

According to the invention, the hypervisor (2) generates a first virtual machine (4), and a virtual control unit operating system (6) is executed on the first virtual machine (4). Within the virtual control unit operating system, a virtual application program (8) of a control unit is executed. This method decouples execution of the computer operating system and execution of the virtual control unit operating system from one another, so that the virtual application program and/or the virtual control unit operating system can directly access the hardware made virtually available.

Control units and computers normally have different processor architectures or instruction sets. Consequently, programs for control units such as, for example, an operating system, application program, and others, cannot be executed on a computer without further ado. But when the source code of the control unit programs is present in a high-level language such as C, for example, this source code can be compiled such that it can be executed on the computer processor. In this way, a virtual control unit operating system and a virtual application program of a control unit are generated. The compilation can take place independently of the rest of the steps of the method, and need not even be carried out on the same computer on which the simulation environment is executed.

The simulation environment 7 can control and initiate the execution of the virtual application program. To this end, data and events can be exchanged between the virtual application program and the simulation environment 7 through a simulation environment interface 9. Thus, data calculated by an environment model, for example, or any desired stimulus signals, can be delivered by the simulation environment 7 to the virtual application program, and in response the virtual application program can also transmit data and events to the simulation environment. Both open-loop and closed-loop simulation are possible in this design.

Hardware-independent application programs of electronic control units can be executed on various processor architectures. Thus it is possible to execute the hardware-independent control unit software on the processor of the computer as well. The processor of the computer typically supports memory protection. In the example of a computer with an x86 processor, the memory protection is provided by the MMU. The processor's memory protection is managed by the computer operating system. The universal operating system that typically is executed on the computer, such as Microsoft Windows, for example, implements memory protection differently than would typically be the case on a control unit. For realistic simulation, the control unit software should be executed in an environment that supports memory protection in the same way as on the target control unit. In order to generate this environment, a control unit operating system that implements the specification of the target control unit is executed on the computer. Using virtualization, the computer operating system and the virtual control unit operating system are executed concurrently on the developer's computer, with each of the two operating systems experiencing a complete computer, including a unit for memory protection and/or a unit for managing memory protection. The virtual application program thus obtains direct access to the unit for memory protection and/or the unit for managing memory protection.

Figure 3:
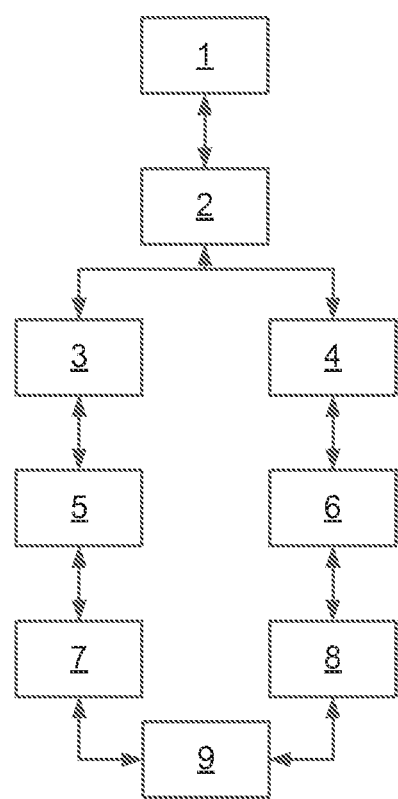
FIG. 3 is a schematic representation of an exemplary embodiment of the method according to the invention for executing an application program of a control unit on a computer.

An alternative embodiment of the method according to the invention is shown schematically in FIG. 3. Here, the hypervisor (2) is executed directly on the hardware of the computer without an operating system being executed between the hypervisor and the computer hardware. The hypervisor multiplexes its interface to the computer hardware, and can thus provide multiple copies of the computer hardware in the form of virtual machines or virtual hardware. In the embodiment shown in FIG. 3, the hypervisor generates two virtual machines (3) and (4). In this design, a computer operating system is executed on one virtual machine (3) and a virtual control unit operating system is executed on the other virtual machine (4). Within the computer operating system, a simulation environment is executed that initiates and controls, through a simulation environment interface 9, the execution of a virtual application program that is executed within the virtual control unit operating system.

Figure 4:
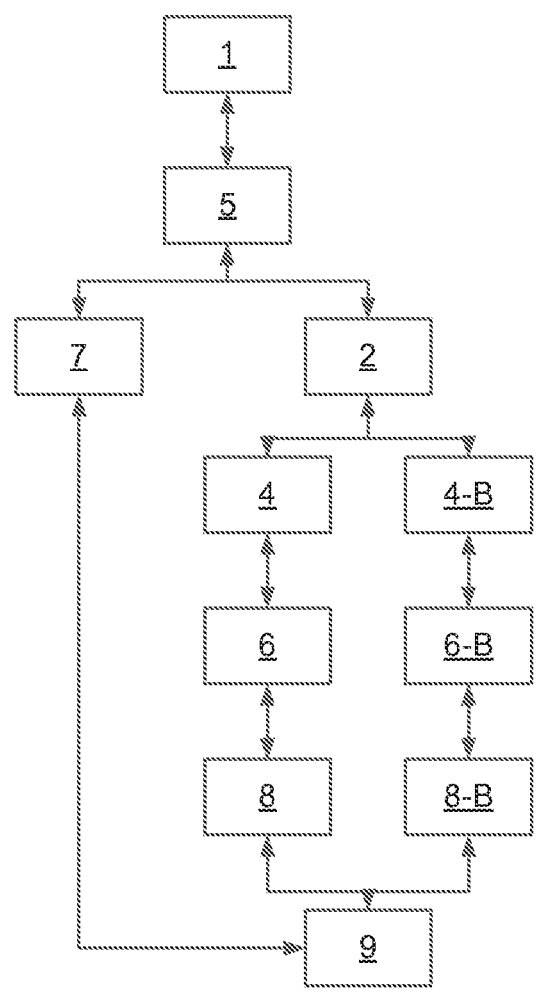
FIG. 4 is a schematic representation of an embodiment of the method according to the invention for executing an application program of a control unit on a computer.
Figure 5:
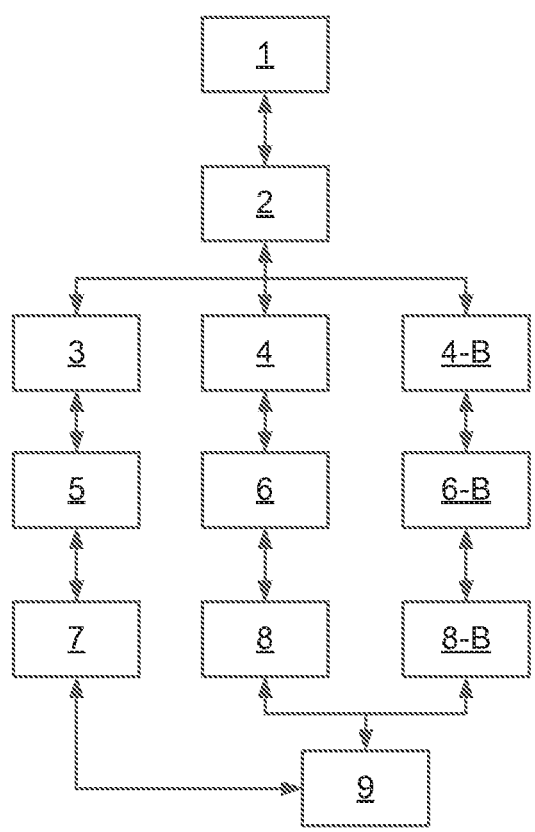
FIG. 5 is a schematic representation of an additional embodiment of the method according to the invention for executing an application program of a control unit on a computer.

In FIGS. 4 and 5, alternative embodiments of the method are shown schematically. This design takes into account the circumstance that a hypervisor can also be executed on a control unit in order to simultaneously execute different operating systems for different applications there. This can be useful, for example, when a control unit is intended to perform tasks for entertainment purposes or navigation and at the same time also analyze vehicle data or even actively intervene in vehicle control. In this case, an AUTOSAR operating system and an Android operating system, for example, would be executed simultaneously in one control unit in two virtual machines (4) and (4-B). The method according to the invention can be used to test control unit software architectures of this nature, as is shown schematically in FIGS. 4 and 5. FIG. 4 is based on FIG. 2 here, with the hypervisor additionally generating a second virtual machine (4-B) in which a second virtual control unit operating system (6-B) and a second virtual application program (8-B) are executed. The two virtual application programs (8 and 8-B) are connected to the simulation environment 7 through the simulation environment interface 9. In an alternative form, a comparable result can also be achieved with the embodiment shown schematically in FIG. 5. Here, the computer operating system (5) and the first and second control unit operating systems (6) and (6-B) are executed in parallel in 3 virtual machines on the computer.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for executing on a computer a first application program for a first control unit, the method comprising:
    executing, by the first application program, functions for controlling actuators and/or functions for processing sensor data,
    wherein the first control unit has at least one first computing core of a first computing core type, and the computer has a computer hardware unit with at least one second computing core of a second computing core type, the first computing core type and the second computing core type having different types of instruction sets;
providing a source code of a control unit operating system;
providing a source code of the first application program;
compiling the source code of the control unit operating system and the source code of the first application program to be executed on the second computing core type;
generating a first virtual control unit operating system and a first virtual application program by the compilation, the first virtual control unit operating system operating on a first virtual machine having the first computing core type;
providing the computer comprising a simulation environment, a computer operating system, the first virtual machine, and a hypervisor, wherein a simulation environment interface is made available by the simulation environment for transfer of a data item and/or of an event to the first virtual application program and/or the virtual control unit operating system from the simulation environment, the simulation environment and the hypervisor being separate processes operating on the computer;
establishing a first interface between the hypervisor and the virtual machine,
wherein a second interface between hardware of the computer and the simulation environment is established by the computer operating system,
wherein the hypervisor provides the first virtual machine of the computer,
wherein the hardware of the computer is made partly or completely available as virtual hardware to the first virtual machine, and
wherein the virtual hardware comprises at least one first virtual computing core of the first computing core type;
initiating and controlling, by the simulation environment, an execution of the first virtual application program within the control unit operating system of the first virtual machine through the simulation environment interface, the controlling including transfer of data and/or events to the first virtual application program and/or the first virtual control unit operating system; and
providing, via the virtual control unit operating system, the first virtual application program with direct access to the hardware of the computer made available to the first virtual machine.

2. The method according to claim 1, wherein the virtual hardware provided by the first virtual machine comprises a memory management unit and/or a memory protection unit of the computer, and wherein the memory management unit and/or memory protection unit are used through the direct access of the first virtual application program.

3. The method according to claim 2, wherein the first application program meets an AUTOSAR specification, and mechanisms specified by the AUTOSAR specification for using the memory management unit or memory protection unit are used within the first application program.

4. The method according to claim 1, wherein the hypervisor is executed as a user process of the computer operating system.

5. The method according to claim 1, wherein direct access to the computer hardware is made possible for the hypervisor, wherein the hypervisor provides a second virtual machine on the computer, and wherein the computer operating system is executed within the second virtual machine.

6. The method according to claim 1, wherein the first virtual application program uses at least one virtual computing core of the first virtual machine through direct access in a privileged mode.

7. The method according to claim 1, further comprising: a second virtual computing core of the first computing core type wherein the first virtual application program comprises a first subroutine and a second subroutine, and wherein the first subroutine is executed on the first virtual computing core and the second subroutine is executed on the second virtual computing core.

8. The method according to claim 1, wherein source code of a second application program for execution on the control unit is on the computer, the source code of the second application program is compiled to be executed on the second computing core type, wherein a second virtual application program is generated by the compilation, and wherein the first virtual application program is executed on the first virtual computing core of the first computing core type and the second virtual application program is executed on the second virtual computing core of the second computing core type.

9. The method according to claim 1, wherein a clock rate of the first virtual machine is changed by the simulation environment.

10. The method according to claim 1, wherein the simulation environment has a simulator interface to an hardware-in-the-loop (HIL) simulator, wherein a second control unit is connected to the HIL simulator, wherein data is exchanged between the second control unit and the first virtual application program, and wherein the data exchange comprises a transmission of electrical signals between the HIL simulator and the second control unit.

11. The method according to claim 1, wherein a second virtual control unit operating system of the first control unit is generated, wherein the hypervisor provides a third virtual machine, and the second virtual control unit operating system is executed in the third virtual machine, wherein a third virtual application program is executed within the second virtual control unit operating system, wherein the simulation environment initiates and controls an execution of the third virtual application program on the second virtual control unit operating system provided within the third virtual machine, and wherein the second virtual control unit operating system provides the third virtual application program with direct access to the third virtual machine.

12. The method according to claim 1, wherein the hypervisor is executed as a process on the computer operating system and the first virtual machine is executed within the hypervisor.

13. The method according to claim 1, wherein the hypervisor is executed directly on the computer, the hypervisor managing the hardware of the computer and providing the first virtual machine and a second virtual machine,
wherein the second virtual machine executes the computer operating system, providing a platform for the simulation environment.

14. The method according to claim 1, wherein the simulation environment interface is executed within the simulation environment.

15. The method according to claim 1, wherein the first virtual machine emulates actual physical hardware of the first control unit.

16. The method according to claim 1, wherein the computer operating system and the control unit operating system are both executed on the at least one second computing core of the second computing core type.

17. The method according to claim 1, wherein the hypervisor manages the first virtual machine and a second virtual machine.

18. The method according to claim 1, wherein the first control unit is a real control unit being accessed via a hardware-in-the-loop (HIL) interface or a virtual control unit being provided by the first virtual machine.

* * * * *